(12) United States Patent
Ogawa

(10) Patent No.: US 9,363,695 B2
(45) Date of Patent: Jun. 7, 2016

(54) RECEPTION DEVICE AND RECEPTION METHOD

(71) Applicant: FUJITSU LIMITED, Kawasaki-shi, Kanagawa (JP)

(72) Inventor: Daisuke Ogawa, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 14/013,981

(22) Filed: Aug. 29, 2013

(65) Prior Publication Data

US 2014/0092764 A1 Apr. 3, 2014

(30) Foreign Application Priority Data

Sep. 28, 2012 (JP) ................. 2012-218242

(51) Int. Cl.
*H04W 24/08* (2009.01)
*H04J 11/00* (2006.01)

(52) U.S. Cl.
CPC ........... *H04W 24/08* (2013.01); *H04J 11/0053* (2013.01)

(58) Field of Classification Search
USPC .......................................................... 370/252
See application file for complete search history.

(56) References Cited

U.S. PATENT DOCUMENTS

| 2012/0252513 | A1 | 10/2012 | Kiyoshima et al. | |
|---|---|---|---|---|
| 2013/0225188 | A1* | 8/2013 | Seo et al. | 455/450 |
| 2013/0235738 | A1* | 9/2013 | Siomina et al. | 370/252 |
| 2014/0293820 | A1* | 10/2014 | Kim et al. | 370/252 |

FOREIGN PATENT DOCUMENTS

| JP | 2011-087233 A | 4/2011 |
|---|---|---|
| WO | WO 2011/122833 A2 | 10/2011 |
| WO | WO 2012070823 A2 * | 5/2012 |
| WO | WO 2013062356 A2 * | 5/2013 |

OTHER PUBLICATIONS

3GPP TS 36.300 V10.7.0, 16.1.5 Inter-cell Interference Coordination (ICIC), Mar. 2012.
Hiroyuki Kawai et al., "Independent Adaptive Control of Surviving Symbol Replica Candidates at Each Stage Based on Minimum Branch Metric in QRM-MLD for VSF-Spread OFDM MIMO Multiplexing", The Institute of Electronics, Information and Communication Engineers, RCS2004-207, Oct. 2004, Partial translation.
Office Action of Japanese Patent Application No. 2012-218242 dated Mar. 15, 2016 with partial translation.

* cited by examiner

*Primary Examiner* — Robert M Morlan
(74) *Attorney, Agent, or Firm* — Arent Fox LLP

(57) ABSTRACT

A reception device includes: an RF circuit configured to receive a first signal transmitted from a first transmission device; and a processor configured to: determine whether at least one symbol of the first signal has a probability of receiving interference from a second signal transmitted from a second transmission device, and measure a reception quality based on a known signal mapped to a symbol other than the at least one symbol determined to have the probability of receiving the interference from the second signal, the known signal being among known signals mapped to symbols of the first signal.

18 Claims, 17 Drawing Sheets

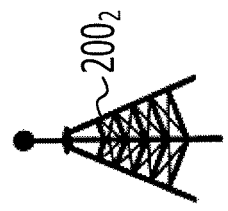
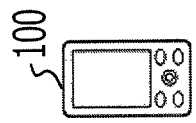
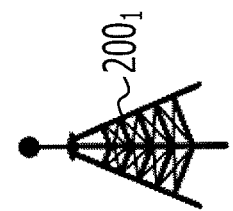
FIG. 4

FIG. 8
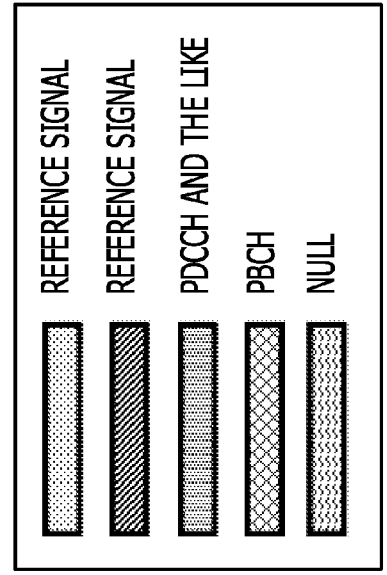
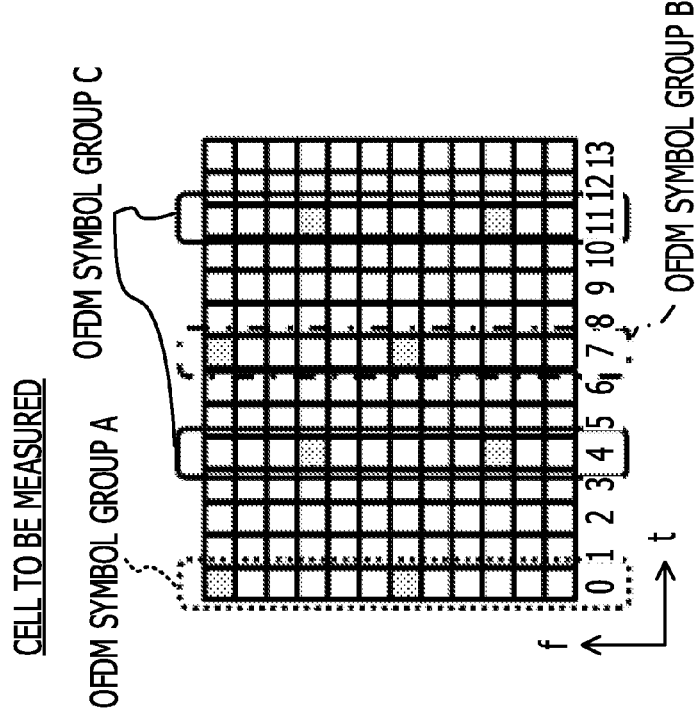

FIG. 9
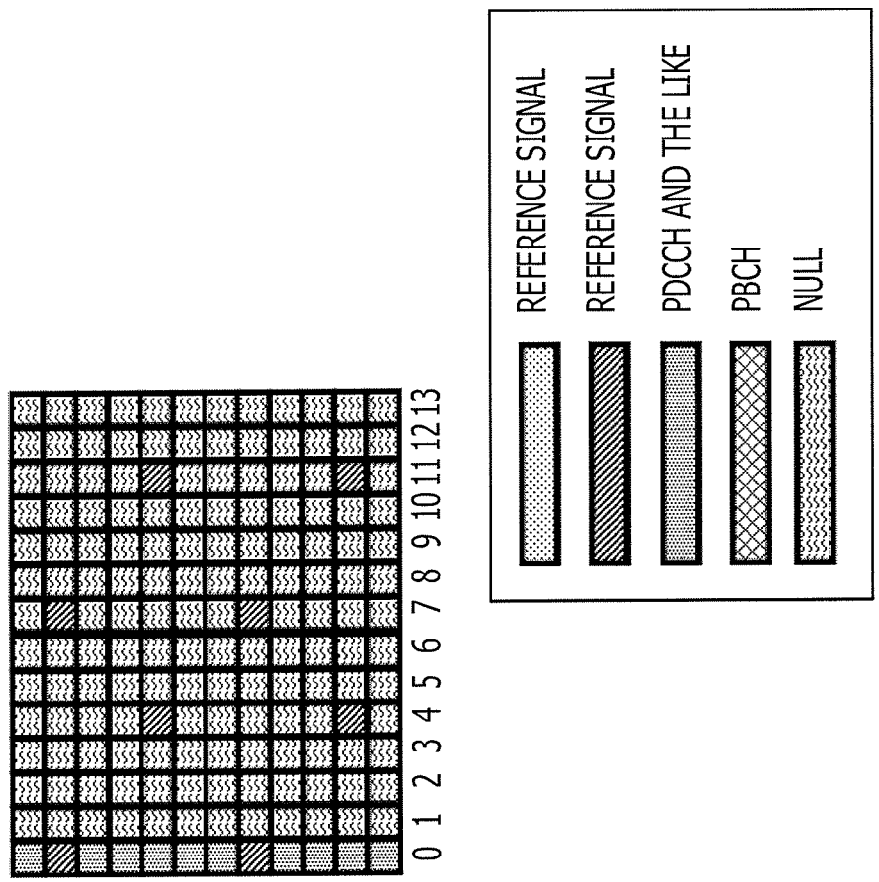
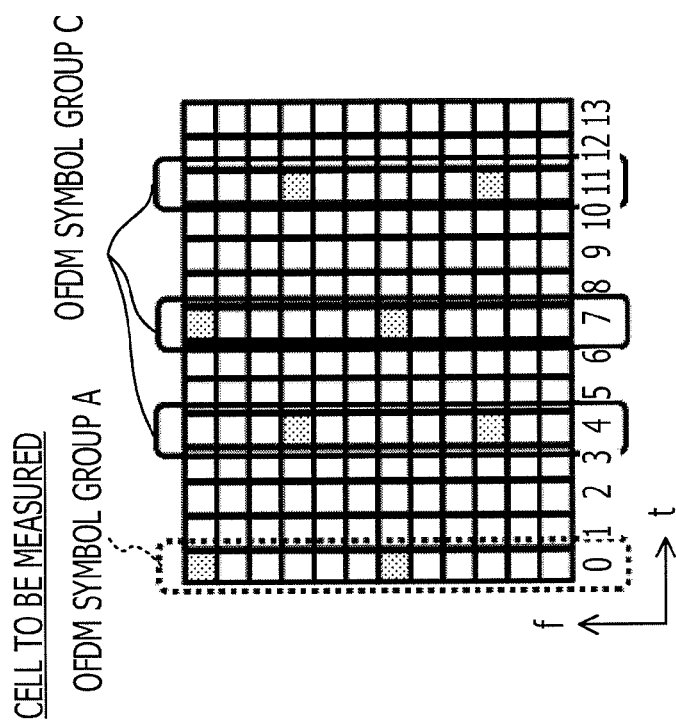

RECEPTION DEVICE AND RECEPTION METHOD

CROSS-REFERENCE TO RELATED APPLICATION

This application is based upon and claims the benefit of priority of the prior Japanese Patent Application No. 2012-218242, filed on Sep. 28, 2012, the entire contents of which are incorporated herein by reference.

FIELD

The embodiment discussed herein is related to a reception device and a reception method

BACKGROUND

In a mobile communication system, a terminal communicates with the optimal base station in accordance with a movement of the terminal.

For example, it is assumed that a terminal that communicates with a base station A moves toward a base station B. When a distance between the terminal and the base station B becomes smaller than a distance between the terminal and the base station A, the radio performance of the terminal that communicates with the base station B is better than the radio performance of the terminal that communicates with the base station A in most cases. In such cases, the terminal executes handover from the base station A to the base station B.

In the mobile communication system, the terminal measures a reception quality of the base station A communicating with the terminal and a reception quality of the base station B located adjacent to the base station A for the handover. A function of measuring and monitoring the reception quality of the communicating base station A and the reception quality of the base station B by the terminal is referred to as a measurement function.

SUMMARY

According to an aspect of the embodiment discussed herein, a reception device includes: an RF circuit configured to receive a first signal transmitted from a first transmission device; and a processor configured to: determine whether at least one symbol of the first signal has a probability of receiving interference from a second signal transmitted from a second transmission device, and measure a reception quality based on a known signal mapped to a symbol other than the at least one symbol determined to have the probability of receiving the interference from the second signal, the known signal being among known signals mapped to symbols of the first signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a radio communication system according to the embodiment;

FIG. 8 is a diagram illustrating an example of OFDM symbol groups of a subframe #0;

FIG. 9 is a diagram illustrating an example of OFDM symbol groups of a subframe other than the subframe #0;

DESCRIPTION OF EMBODIMENT

Figure 1:
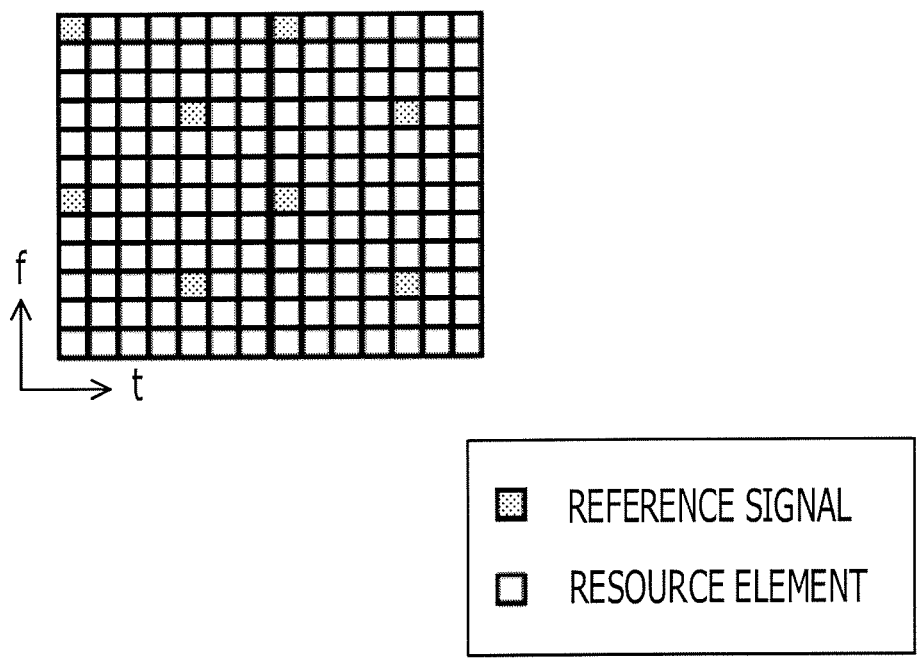
FIG. 1 is a diagram illustrating an example of mapping of reference signals.

Hereinafter, the embodiment is described with reference to the accompanying drawings. Parts that have the same functions are indicated by the same reference numerals and symbols in all the drawings describing the embodiment, and a repetitive description thereof is omitted.

While inventing the present embodiment, observations were made regarding a related art. Such observations include the following, for example.

A measurement function for Long Term Evolution (LTE) is described, for example.

FIG. 1 illustrates an Orthogonal Frequency Division Multiplexing (OFDM) signal represented by two-dimensional directions, a time direction (t) and a frequency direction (f). An OFDM symbol may be the minimum unit in the time direction, and a subcarrier may be the minimum unit in the frequency direction. For LTE, various signals are mapped while resource elements (REs) are used as units.

FIG. 1 illustrates resource elements to which known signals that are referred to as reference signals (RSs) are mapped. The RSs include pattern series specific to a base station. A terminal may measure reference signal received power (RSRP) using an RS series related to a base station of which a reception quality is to be measured. For a measurement, the terminal measures the RSRP power using the RS series related to the base station of which the reception quality is to be measured.

A receiver receives radio signals through a plurality of antennas. The receiver has a radio frequency (RF) unit that obtains a signal in a desired frequency band. The receiver executes down conversion on the signal in the desired frequency band. The receiver has an AD converter that converts the signal subjected to the down conversion into a digital signal so as to obtain the signal in a digital baseband. The receiver demodulates the signal in the digital baseband and decodes the signal.

The receiver uses signals in the digital baseband to measure reception qualities of cells.

The terminal measures the RSRP and a reference signal received quality (RSRQ). The RSRQ is measured based on the RSRP and a received signal strength indicator (RSSI).

The terminal executes a correlation operation using an RS series corresponding to a base station to be measured in order to calculate the RSRP. Since an RS is transmitted at certain intervals, the terminal calculates the average of results of the correlation operation. The terminal calculates the RSRP using the average of the results of the correlation operation.

For LTE-Advanced (LTE-A) that is enhanced LTE, an inter-cell interference control technique that is referred to as enhanced Inter-Cell Interference Coordination (eICIC) is used (refer to, for example, "3GPP TS 36.300 V10.7.0, 16.1.5 Inter-cell Interference Coordination (ICIC), 2012-0.3").

Figure 2:
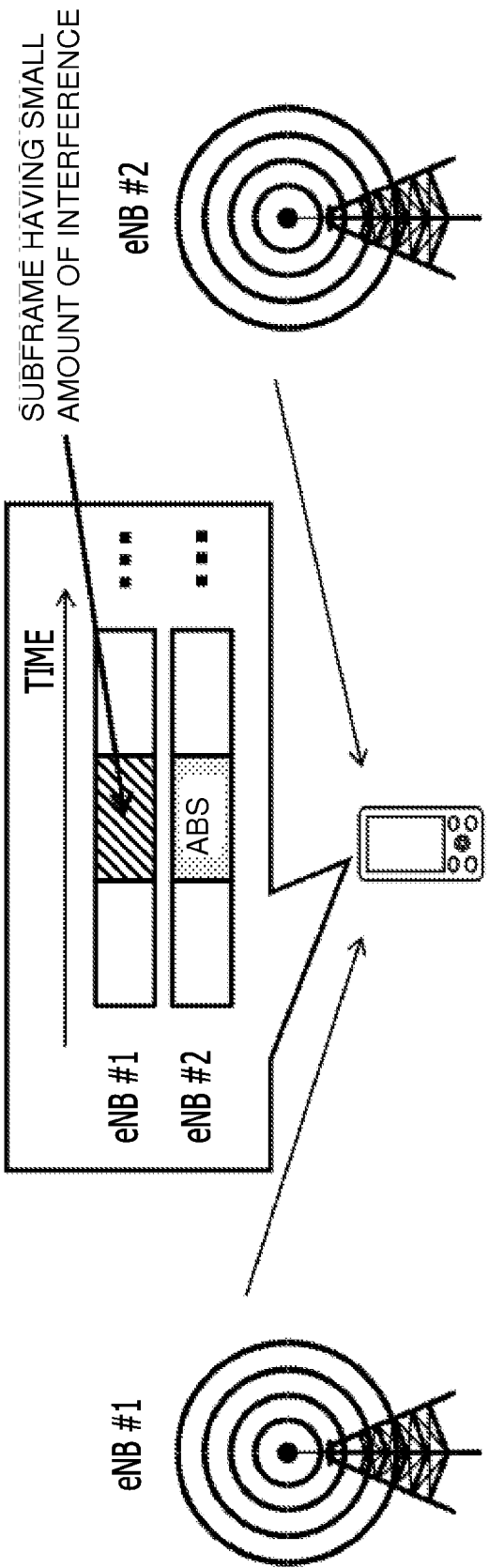
FIG. 2 is a diagram illustrating inter-cell interference control.

FIG. 2 is a diagram describing eICIC.

When the terminal communicates an eNB #1, a signal that is transmitted from an eNB #2 causes interference. The eNB #2 is a cell located adjacent to the eNB #1. A signal is transmitted from the eNB #2 to a terminal other than the interested terminal.

For eICIC, a time zone in which a signal is almost not transmitted from the eNB #2 is provided. Interference of signals transmitted to a terminal is reduced by communication executed between the terminal and the eNB #1 in the time zone in which a signal is almost not transmitted from the eNB #2.

For LTE-A, a subframe in which a signal is almost not transmitted is prepared. The subframe is referred to as an almost blank subframe (ABS). Data is almost not transmitted from the eNB #2 for the ABS. For the subframe, a signal that is transmitted from the eNB #2 does not become a source of interference with the eNB #1. Interference of signals transmitted to the terminal is reduced by communication executed between the terminal and the eNB #1 for the ABS.

The terminal that communicates with the eNB #2 measures the RSRP of the eNB #1 using the RS, included in the ABS transmitted from the eNB #2, of the eNB #1. In addition, the terminal that executes handover to the eNB #1 measures the RSRP of the eNB #1 using the RS, included in the ABS, of the eNB #1. The terminal may communicate with the eNB #1 for the ABS by executing the handover to the eNB #1.

If eICIC is used, a terminal executes the correlation operation using an RS series corresponding to a base station to be measured and an RS included in an ABS, calculates the average of results of the correlation operation, and calculates RSRP using the average of the results of the correlation operation.

Figure 3:
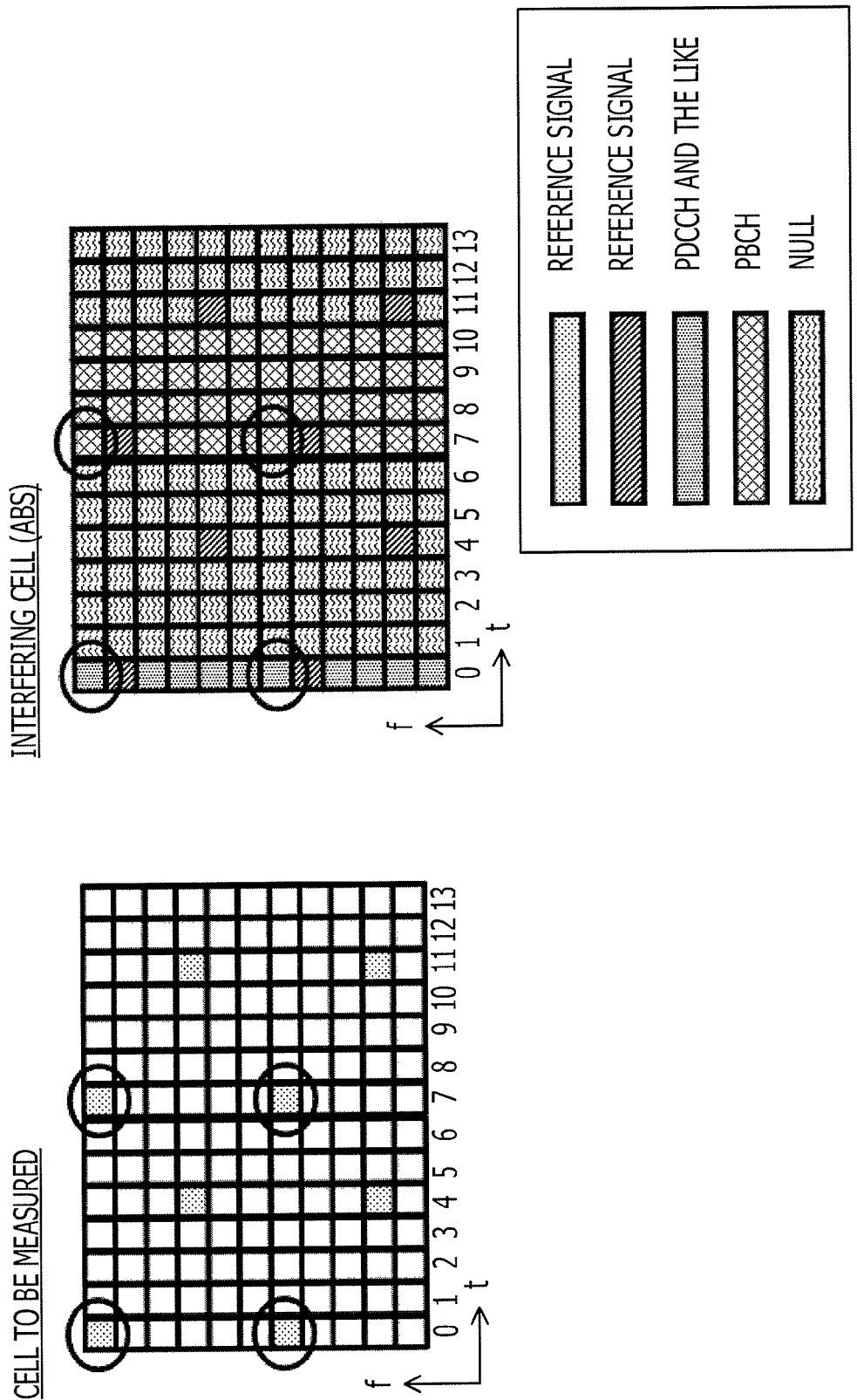
FIG. 3 is a diagram illustrating an example of subframes of downlink signals.

FIG. 3 illustrates an example of a subframe transmitted from a cell (cell to be measured) of which a reception quality is measured and an ABS transmitted from an interfering cell. In FIG. 3, the abscissa indicates time, and the ordinate indicates a frequency. An OFDM symbol may be used as a unit of the time, while a resource element may be used as a unit of the frequency.

The terminal measures the RSRP using the RS transmitted from the cell of which the reception quality is measured. The RS, a physical downlink control channel (PDCCH), and the like are transmitted for the ABS. Thus, the subframe transmitted from the cell of which the reception quality is measured may collide with the ABS transmitted from the interfering cell. In FIG. 3, circles indicate RSs that may collide.

(a) For OFDM symbols at a time 0, the RS that is transmitted from the cell of which the reception quality is measured may collide with a control signal that is the PDCCH transmitted from the interfering cell or another signal. Specifically, the RS transmitted from the cell of which the reception quality is measured may receive interference from the control signal transmitted from the interfering cell. In all subframes, probabilities of collisions are substantially the same.

(b) For OFDM symbols at times 4 and 11, the RS that is transmitted from the cell of which the reception quality is measured does not collide with the control signal that is the PDCCH signal transmitted from the interfering cell or another signal.

(c) For OFDM symbols at a time 7, the RS that is transmitted from the cell of which the reception quality is measured may collide with a physical broadcast channel (PBCH) transmitted from the interfering cell. Specifically, the RS that is transmitted from the cell of which the reception quality is measured may receive interference from the PBCH transmitted from the interfering cell. The collision may occur to a subframe with a subframe number 0.

It is assumed that a collision or interference occurs to the OFDM symbols at the times 0 and 7. Based on this assumption, the accuracy of RSRP calculated based on the RSs included in the OFDM symbols at the times 0 and 7 is lower than the accuracy of RSRP calculated based on RSs included in the OFDM symbols at the times 4 and 11.

Specifically, when the RSRP is calculated based on the RSs included in the OFDM symbols at the times 0, 4, 7, and 11, sufficient accuracy of the RSRP may not be obtained.

A reception device according to the present embodiment disclosed herein is provided for the purpose of improving the accuracy of measurement of a reception quality.

Radio Communication System

FIG. 4 illustrates a radio communication system according to the embodiment.

The radio communication system according to the embodiment includes a user terminal 100 and base stations $200_1$ to $200_n$ (n is an integer of 2 or more). FIG. 4 illustrates the case where n=2 as an example.

Any of subframes that are transmitted from the first base station $200_1$ and the second base station $200_2$ is treated as a transmission stop subframe for interference coordination between the first base station $200_1$ and the second base station $200_2$. The transmission stop subframe includes an ABS and a Multimedia Broadcast/Multicast Service over a Single Frequency Network (MBSFN) subframe. The case where ABS is included is described below in the embodiment of the radio communication system.

For example, when the user terminal 100 is located within the coverage of the first base station $200_1$, a downlink signal transmitted from the second base station $200_2$ may cause interference. In this case, the ABS is included in the downlink signal transmitted from the second base station $200_2$. During transmission of the ABS, the user terminal 100 may reduce the interference caused by the downlink signal transmitted from the second base station $200_2$ while receiving a downlink signal from the first base station $200_1$.

Reception Device

Figure 5:
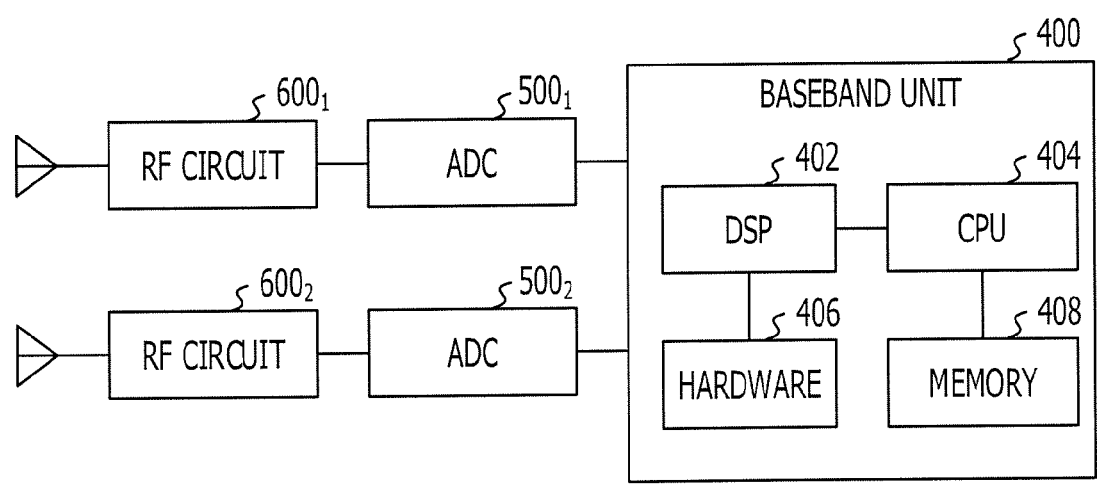
FIG. 5 is a diagram illustrating a reception device according to the embodiment.

FIG. 5 illustrates a reception device 300 according to the embodiment. FIG. 5 illustrates a hardware configuration of the reception device 300. The reception device 300 may be installed in the user terminal 100 and each of the base stations $200_1$ to $200_n$.

The case where the user terminal 100 is located within the coverage of the first base station $200_1$ is described below.

The reception device 300 includes RF circuits $600_1$ to $600_m$ (m is an integer of 2 or more), ADCs $500_1$ to $500_m$, and a baseband unit (BBU) 400. FIG. 5 illustrates the case where m=2.

The RF circuits $600_1$ to $600_m$ are configured by analog circuits. The RF circuits $600_1$ to $600_m$ receive radio signals from the first base station $200_1$. The RF circuits $600_1$ to $600_m$ obtain signals in a desired frequency band from the received radio signals, executes down conversion on the signals, and cause the signals to be input to the ADCs $500_1$ to $500_m$.

The ADCs $500_1$ to $500_m$ are connected to the RF circuits $600_1$ to $600_m$, respectively. The ADCs $500_1$ to $500_m$ convert the signals received from the RF circuits $600_1$ to $600_m$ into digital signals. The ADCs $500_1$ to $500_m$ cause the digital signals to be input to the baseband unit 400.

The RF circuits $600_1$ to $600_m$ and the ADCs $500_1$ to $500_m$ may be unified and achieved as an RFIC.

The baseband unit 400 includes a digital signal processor (DSP) 402, a central processing unit (CPU) 404, hardware 406, and a memory 408.

The DSP 402 executes baseband signal processing in accordance with a command from the CPU 404. The DSP 402 processes data received from the first base station $200_1$ in accordance with a command from the CPU 404.

The CPU 404 is connected to the DSP 402. The CPU 404 causes the DSP 402 to execute digital signal processing in accordance with software such as firmware installed in the baseband unit 400, a program stored in the memory 408, and the like.

The hardware 406 is connected to the DSP 402. The hardware 406 executes various processes including a demodulation process, a modulation process, and a measurement process.

The memory 408 is connected to the CPU 404. The memory 408 stores programs that cause the DSP 402 and the CPU 404 to execute the processing.

Functions of Reception Device 300

Figure 6:
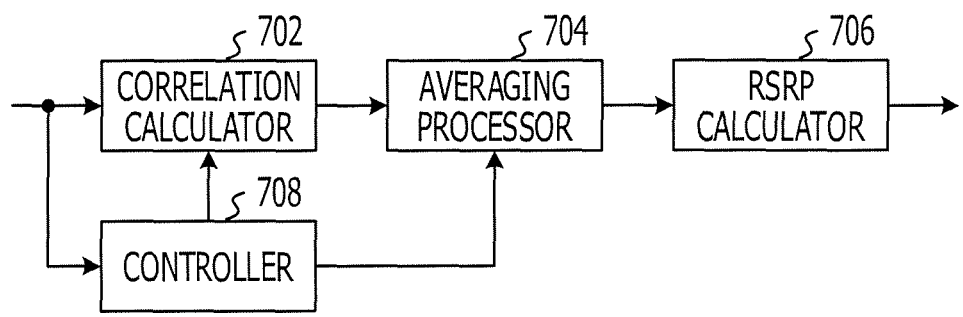
FIG. 6 is a functional block diagram of the reception device according to the embodiment.

FIG. 6 illustrates the reception device 300 according to the embodiment. In FIG. 6, processes that are executed by the baseband unit 400 of the reception device 300 are mainly illustrated.

The reception device 300 includes a correlation calculator 702, an averaging processor 704, an RSRP calculator 706, and a controller 708.

The CPU 404 may function as the controller 708. The DSP 402 may function as the correlation calculator 702, the averaging processor 704, and the RSRP calculator 706.

The correlation calculator 702 uses an RS series of the first base station $200_1$ to be measured and thereby executes a correlation operation on RSs from the ADC $500_m$ in accordance with control by the controller 708. The correlation calculator 702 may calculate the average of results of the correlation operation on a plurality of RSs mapped in the frequency direction. The correlation calculator 702 causes results of the correlation operation to be input to the averaging processor 704.

The averaging processor 704 is connected to the correlation calculator 702. The averaging processor 704 calculates the average of the results, received from the correlation calculator 702, of the correlation operation in accordance with control by the controller 708. For example, the averaging processor 704 calculates the time average of correlation results, received from the correlation calculator 702, of OFDM symbols. The average processor 704 causes the average of the results of the correlation operation to be input to the RSRP calculator 706.

The RSRP calculator 706 is connected to the averaging processor 704. The RSRP calculator 706 calculates RSRP using the average, calculated by the averaging processor 704, of the results of the correlation operation.

Figure 7:
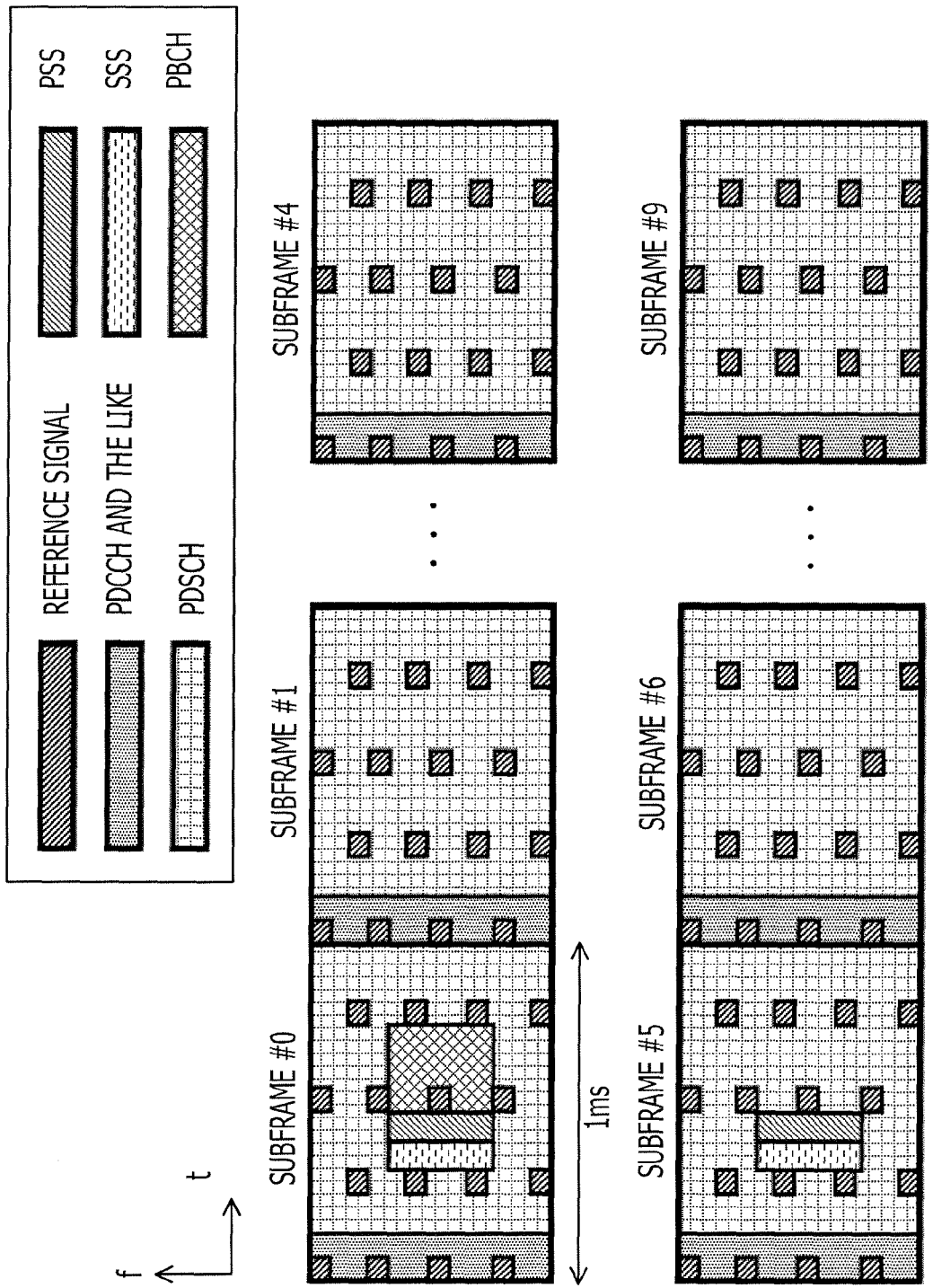
FIG. 7 is a diagram illustrating an example of radio frames of a downlink signal.

FIG. 7 illustrates an example of a frame configuration of a downlink signal for LTE. In the example of FIG. 7, a frequency division duplex scheme is used. The reception device 300 according to the embodiment receives a downlink signal transmitted by the frequency division duplex scheme. The embodiment is applicable to the case where the reception device 300 receives a downlink signal transmitted by a time division duplex scheme.

A 10 ms radio frame of an LTE system includes subframes #0 to #9.

A PDCCH, a PCFICH, and a PHICH are mapped to the first to fourth OFDM symbols of each of all the subframes. The PCFICH stands for a physical control format indicator channel. The PHICH stands for a physical hybrid ARQ indicator channel.

An RS and a physical downlink shared channel (PDSCH) are mapped to each of all the subframes.

A primary synchronization signal (PSS) and a secondary synchronization signal (SSS) are mapped to each of the subframes #0 and #5.

A physical broadcast channel (PBCH) is mapped to the subframe #0.

In the embodiment of the reception device 300, OFDM symbols that are included in the subframes are classified into multiple groups. As an example, the case where the OFDM symbols included in the subframes are classified into three groups is described below.

When the OFDM symbols are to be classified into the three groups, the OFDM symbols are classified into an OFDM symbol group A that may receive interference from a downlink signal from an interfering cell, an OFDM symbol group B that receives interference from the downlink signal from the interfering cell, and an OFDM symbol group C that does not receive interference from the downlink signal from the interfering cell.

FIG. 8 illustrates an example of a subframe #0 transmitted from a cell of which RSRP is to be measured and an ABS transmitted from an interfering cell. The cell of which the RSRP is to be measured may be the first base station $200_1$, while the interfering cell may be the second base station $200_2$.

For OFDM symbols at the time 0, a control signal that is a PDCCH or the like may be transmitted from the interfering cell. An RS that is transmitted from the cell of which the RSRP is to be measured may collide with the control signal (such as the PDCCH) transmitted from the interfering cell, and is therefore classified into the OFDM symbol group A.

For OFDM symbols at the time 7, a physical broadcast channel is transmitted from the interfering cell. Thus, the RS that is transmitted from the cell of which the RSRP is to be measured collides with the physical broadcast channel transmitted from the interfering cell, and is therefore classified into the OFDM symbol group B.

For OFDM symbols at times 4 and 11, the RS that is transmitted from the cell of which the RSRP is to be measured does not collide with the control signal (such as the PDCCH) transmitted from the interfering cell, and is therefore classified into the OFDM symbol group C.

FIG. 9 illustrates an example of the ABS transmitted from the interfering cell and a subframe that is other than the subframe #0 and transmitted from the cell of which the RSRP is to be measured. In this example, the physical broadcast channel is not transmitted from the interfering cell.

For OFDM symbols at the time 0, the control signal that is the PDCCH or the like may be transmitted from the interfering cell. Thus, the RS that is transmitted from the cell of which the RSRP is to be measured may collide with the control signal (such as the PDCCH) transmitted from the interfering cell, and is therefore classified into the OFDM symbol group A.

For OFDM symbol ay the times 4, 7, and 11, the RS that is transmitted from the cell of which the RSRP is to be measured does not collide with the control signal (such as the PDCCH) transmitted from the interfering cell, and is therefore classified into the OFDM symbol group C.

The controller 708 detects numbers of subframes input to the correlation calculator 702 from the ADCs $500_1$ to $500_m$. For example, in order for the reception device 300 to synchronize with one of the base stations $200_1$ to $200_n$, the controller 708 detects a subframe number of a downlink signal transmitted from the one of the base station $200_1$ to $200_n$. The controller 708 causes, based on the detected subframe number, an OFDM symbol group that is to be used for the correlation operation to be input to the correlation calculator 702. If the subframe number detected by the controller 708 is #0, the OFDM symbol groups A and C may be used for the correlation operation. The controller 708 causes the times 0, 4, and 11 indicating OFDM symbols included in the OFDM symbol groups A and C to be input to the correlation calculator 702 and the averaging processor 704.

If the subframe number detected by the controller 708 is not #0, the OFDM symbol groups A and C may be used for the correlation operation. The controller 708 causes the times 0, 4, and 11 indicating the OFDM symbols included in the OFDM symbol groups A and C to be input to the correlation calculator 702 and the averaging processor 704.

Operations of Reception Device 300

Figure 10:
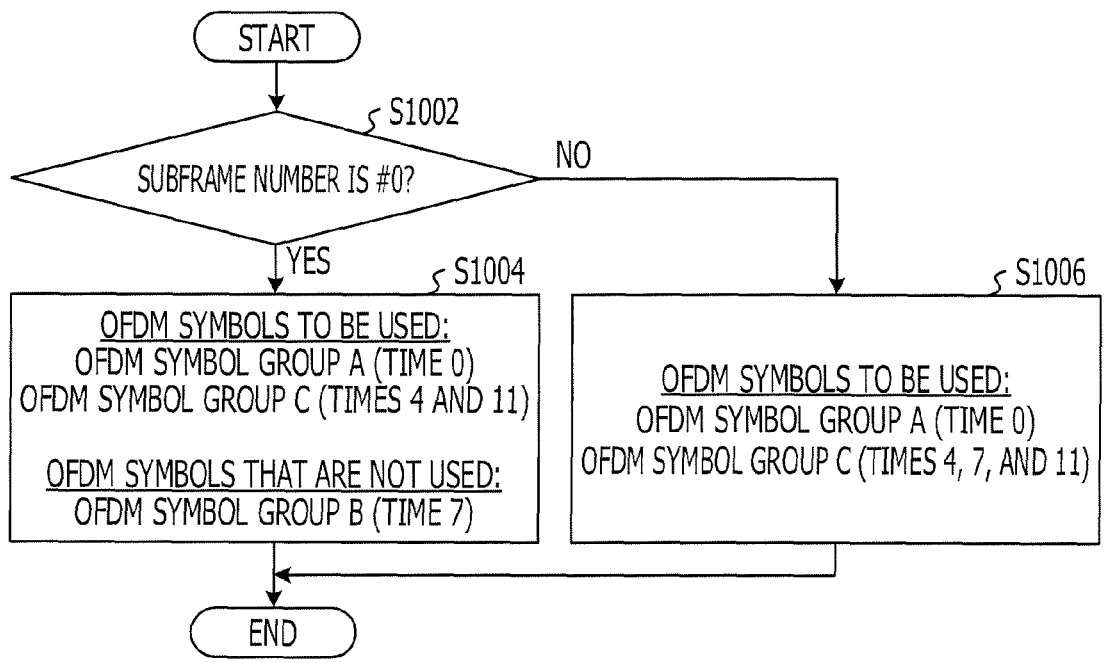
FIG. 10 is a flowchart of operations of the reception device according to the embodiment.

FIG. 10 is a flowchart of operations of the reception device 300 according to the embodiment.

In step S1002, the controller 708 determines whether or not a subframe to be input to the correlation calculator 702 is the subframe #0.

If the controller 708 determines that the subframe to be input is the subframe #0 in step S1002, the controller 708 sets OFDM symbols to be used for the correlation operation in the correlation calculator 702 and the averaging processor 704 in step S1004. Specifically, the controller 708 sets the OFDM symbol groups A and C to the OFDM symbols to be used. If the subframe to be input is the subframe #0, the time 0 is included in the OFDM symbol group A, and the times 4 and 11 are included in the OFDM symbol group C.

If the controller 708 determines that the subframe to be input is not the subframe #0 in step S1002, the controller 708 sets OFDM symbols to be used for the correlation operation in the correlation calculator 702 and the averaging processor 704 in step S1006. Specifically, the controller 708 sets the OFDM symbol groups A and C to the OFDM symbols to be used. If the subframe to be input is not the subframe #0, the time 0 is included in the OFDM symbol group A, and the times 4, 7 and 11 are included in the OFDM symbol group C.

For example, OFDM symbols at the time 7, which are included in the subframe #0, collide with the PBCH transmitted from the interfering cell. According to the flowchart illustrated in FIG. 10, however, the OFDM symbols at the time 7 are not included in the OFDM symbol groups A and C by step S1004 and not used for the correlation operation and the average calculation process.

The reception device 300 according to the embodiment does not use the OFDM symbols at the time 7, which collide with the physical broadcast channel transmitted from the interfering cell and are included in the subframe #0, and whereby the accuracy of measuring or calculating the RSRP of the subframe #0 may be improved. The accuracy of measuring the reception quality may be improved by improving the accuracy of calculating the RSRP of the subframe #0.

For example, a desired signal is indicated by s, and noise of two different types is indicated by n1 and n2.

When received signals are indicated by y1 and y2, the following Equations (1) and (2) are obtained. For example, the signal y1 is a received signal corresponding to one of RSs included in the OFDM symbols at the time 0, and the signal y2 is a received signal corresponding to one of RSs included in the OFDM symbols at the time 7.

$$y1 = s + n1 \quad (1)$$

$$y2 = s + n2 \quad (2)$$

In order to obtain the desired signal s, Equations (1) and (2) are averaged and the amount of the noise is suppressed. Then, Equation (3) is obtained.

$$\tfrac{1}{2}(y1+y2) = s + \tfrac{1}{2}(n1+n2) \quad (3)$$

In Equation (3), a value of ($\tfrac{1}{2}$(n1+n2)) indicates the noise.

The average power of the noise is represented by Equation (4).

$$(|\tfrac{1}{2}(n1+n2)|^2) = \tfrac{1}{4}(\langle |n1|^2 \rangle + \langle |n2|^2 \rangle) \quad (4)$$

It is assumed that the noise n1 is uncorrelated with the noise n2.

When the signal y1 is used, noise power is a value of ($\langle |n1|^2 \rangle$).

It is considered whether or not it is better to calculate the average of the noise n1 and n2 if the noise n1 and n2 is not equal to each other.

$$\tfrac{1}{4}(\langle |n1|^2 \rangle + \langle |n2|^2 \rangle) >$$
$$\langle |n1|^2 \rangle \quad \langle |n2|^2 \rangle > 3\langle |n1|^2 \rangle \quad (5)$$

It is apparent from Equation (5) that when $\langle |n2|^2 \rangle$ is larger than three times as large as $\langle |n1|^2 \rangle$, it is better to use the signal y1 without calculating the average of the signals y1 and y2.

First Modified Example

The reception device 300 according to the first modified example is described with reference to FIGS. 5 and 6.

The reception device 300 according to the first modified example does not use the ODFM symbols at the time 0 for the calculation of the RSRP, while the RS transmitted from the cell of which the RSRP is to be measured may collide with the control signal (such as the PDCCH) transmitted from the interfering cell for the ODFM symbols at the time 0. In other words, if the subframe is to be input is the subframe #0, the OFDM symbols at the times 4 and 11 are used for the calculation of the RSRP. If the subframe to be input is not the subframe #0, the OFDM symbols at the times 4, 7, and 11 are used for the calculation of the RSRP.

Operations of Reception Device 300

Figure 11:
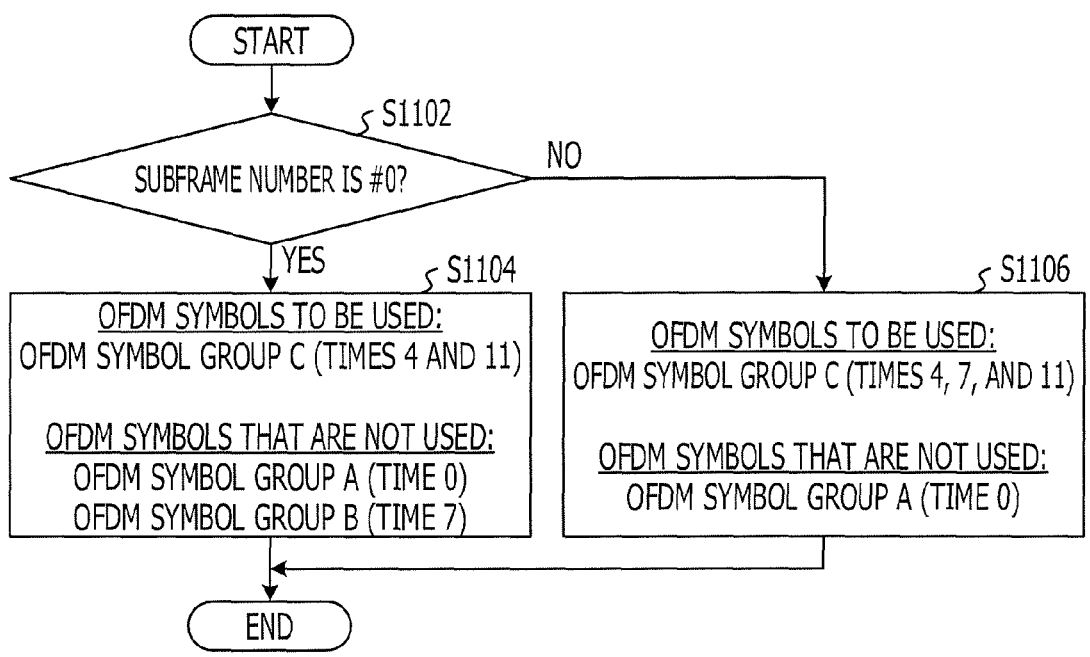
FIG. 11 is a flowchart of operations of the reception device according to a first modified example.

FIG. 11 is a flowchart of operations of the reception device 300 according to the first modified example.

In step S1102, the controller 708 determines whether or not the subframe to be input to the correlation calculator 702 is the subframe #0.

If the controller 708 determines that the subframe to be input is the subframe #0 in step S1102, the controller 708 sets OFDM symbols to be used for the correlation operation in the correlation calculator 702 and the averaging processor 704 in step S1104. Specifically, the controller 708 sets the OFDM symbol group C to the OFDM symbols to be used. If the subframe to be input is the subframe #0, the times 4 and 11 are included in the OFDM symbol group C.

If the controller 708 determines that the subframe to be input is not the subframe #0 in step S1102, the controller 708 sets OFDM symbols to be used for the correlation operation in the correlation calculator 702 and the averaging processor 704 in step S1104. Specifically, the controller 708 sets the OFDM symbol group C to the OFDM symbols to be used. If the subframe to be input is not the subframe #0, the times 4, 7, and 11 are included in the OFDM symbol group C.

Since the reception device 300 according to the first modified example does not use the OFDM symbols at the time 0 for the calculation of the RSRP, the accuracy of the RSRP may be improved. The accuracy of measuring the reception quality may be improved by improving the accuracy of calculating the RSRP.

Second Modified Example

The reception device 300 according to the second modified example is described with reference to FIG. 5.

The reception device 300 measures the amount of interference for each of OFDM symbol groups. The reception device 300 sets, based on the measured amounts of the interference, OFDM symbol groups to be averaged for the calculation of the RSRP.

Functions of Reception Device 300

Figure 12:
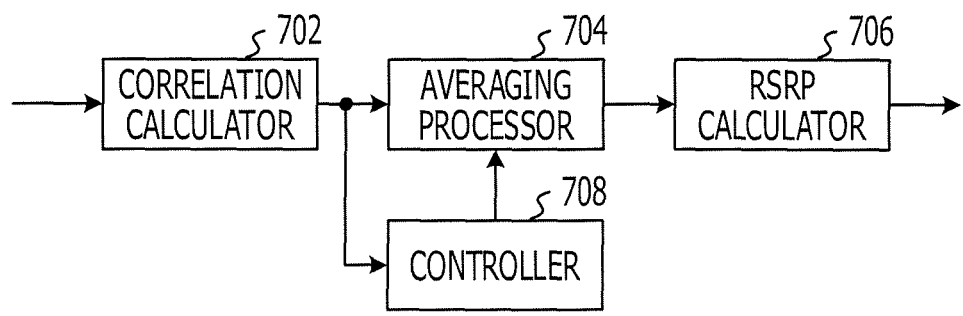
FIG. 12 is a functional block diagram of the reception device according to a second modified example.

FIG. 12 illustrates the reception device 300 according to the second modified example. In FIG. 12, processes that are executed by the baseband unit 400 of the reception device 300 are mainly illustrated.

The reception device 300 includes the correlation calculator 702, the averaging processor 704, the RSRP calculator 706, and the controller 708.

The CPU 404 may function as the controller 708. The DSP 402 may function as the correlation calculator 702, the averaging processor 704, and the RSRP calculator 706.

The correlation calculator 702 uses an RS series of a base station to be measured and thereby executes the correlation operation on RSs received from the ADCs $500_1$ to $500_m$. The correlation calculator 702 may calculate the average of results of the correlation operation executed on multiple RSs mapped in the frequency direction. The correlation calculator 702 causes the results of the correlation operation to be input to the averaging processor 704.

The averaging processor 704 is connected to the correlation calculator 702. The averaging processor 704 calculates the average of the results, received from the correlation calculators 702, of the correlation operation in accordance with control by the controller 708. For example, the averaging processor 704 calculates the time average of the correlation results, received from the correlation calculator 702, of OFDM symbols. The averaging processor 704 causes the average of the results of the correlation operation to be input to the RSRP calculator 706.

The RSRP calculator 706 is connected to the averaging processor 704. The RSRP calculator 706 calculates the RSRP using the average, received from the averaging processor 704, of the results of the correlation operation.

Figure 13:
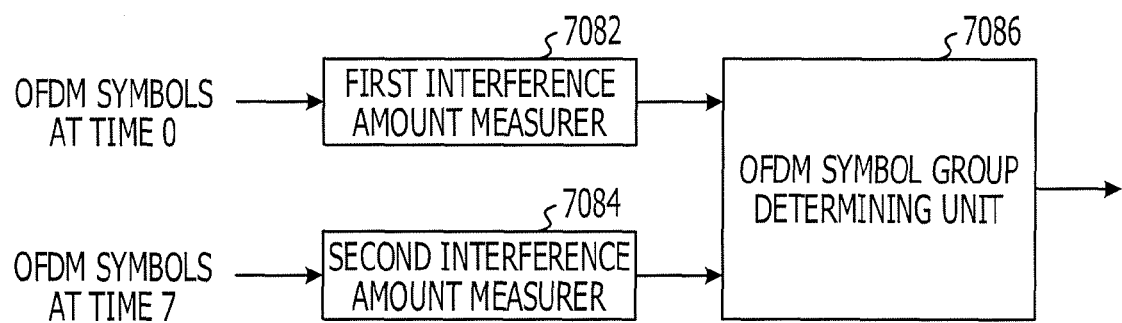
FIG. 13 is a functional block diagram of the reception device according to the second modified example.

FIG. 13 illustrates the controller 708 according to the second modified example. The controller 708 includes a first interference amount measurer 7082, a second interference amount measurer 7084, and an OFDM symbol group determining unit 7086.

The reception device 300 according to the second modified example classifies OFDM symbols included in subframes into multiple groups. As an example, the case where the OFDM symbols are classified into three groups is described below.

If the OFDM symbols are to be classified into the three groups, the OFDM symbols are classified into an OFDM symbol group A that may receive interference, an OFDM symbol group B that receives interference, and an OFDM symbol group C that does not receive interference.

The OFDM symbols at the time 0 are input to the first interference amount measurer 7082. The first interference amount measurer 7082 measures the amount (hereinafter referred to as "interference amount $I_1$") of interference related to the OFDM symbol group A based on the OFDM symbols at the time 0. For the measurement of the interference amount $I_1$, various methods may be used (refer to, for example, "Kawai, Higuchi, Sawahashi, "Independent Adaptive Control of Surviving Symbol Replica Candidates at Each Stage Based on Minimum Branch Metric in QRM-MLD for VSF-Spread OFDM MIMO Multiplexing" "The Institute of Electronics, Information and Communication Engineers, RCS2004-207, October, 2004""). The first interference amount measurer 7082 causes the interference amount $I_1$ to be input to the OFDM symbol group determining unit 7086.

The OFDM symbols at the time 4 are input to the second interference amount measurer 7084. The second interference amount measurer 7084 measures the amount (hereinafter referred to as "interference amount $I_2$") of interference related to the OFDM symbol group B based on the OFDM symbols at the time 7. For the measurement of the interference amount $I_2$, various methods may be used (refer to, for example, "Kawai, Higuchi, Sawahashi, "Independent Adaptive Control of Surviving Symbol Replica Candidates at Each Stage Based on Minimum Branch Metric in QRM-MLD for VSF-Spread OFDM MIMO Multiplexing" "The Institute of Electronics, Information and Communication Engineers, RCS2004-207, October, 2004""). The second interference amount measurer 7084 causes the interference amount $I_2$ to be input to the OFDM symbol group determining unit 7086.

The OFDM symbol group determining unit 7086 determines, based on the interference amount $I_1$ received from the first interference amount measurer 7082, whether or not the OFDM symbol group A is used for the process of calculating the average of the results of the correlation operation by the averaging processor 704. Specifically, if the interference amount $I_1$ exceeds a given threshold $X_{th}$, the OFDM symbol group determining unit 7086 determines that the OFDM symbol group A is not used for the process of calculating the average of the results of the correlation operation by the averaging processor 704. This is due to the fact that if the interference amount $I_1$ exceeds the given threshold $X_{th}$, it is determined that the interference amount $I_1$ of the OFDM symbol group A is large. If the interference amount $I_1$ does not exceed the given threshold $X_{th}$, the OFDM symbol group determining unit 7086 determines that the OFDM symbol group A is used for the process of calculating the average of the results of the correlation operation by the averaging processor 704. This is due to the fact that if the interference amount $I_1$ does not exceed the given threshold $X_{th}$, it is determined that the interference amount $I_1$ of the OFDM symbol group A is small.

The OFDM symbol group determining unit 7086 determines, based on the interference amount $I_2$ received from the second interference amount measurer 7084, whether or not the OFDM symbol group B is used for the process of calculating the average of the results of the correlation operation by the averaging processor 704. Specifically, if the interference amount $I_2$ exceeds a given threshold $X_{th}$, the OFDM symbol group determining unit 7086 determines that the OFDM symbol group B is not used for the process of calculating the average of the results of the correlation operation by the averaging processor 704. This is due to the fact that if the interference amount $I_2$ exceeds the given threshold $X_{th}$, it is determined that the interference amount $I_2$ of the OFDM symbol group B is large. If the interference amount $I_2$ does not exceed the given threshold $X_{th}$, the OFDM symbol group determining unit 7086 determines that the OFDM symbol group B is used for the process of calculating the average of the results of the correlation operation by the averaging processor 704. This is due to the fact that if the interference amount $I_2$ does not exceed the given threshold $X_{th}$, the interference amount $I_2$ of the OFDM symbol group B is small. The threshold $X_{th}$ that is compared with the interference amount $I_1$ may be equal to or different from the threshold $X_{th}$ that is compared with the interference amount $I_2$.

The reception device 300 according to the second modified example uses the OFDM symbol group C for the process of calculating the average of the results of the correlation operation by the averaging processor 704.

Since the OFDM symbol group B does not exist in subframes other than the subframe #0, the process is executed based on the interference amount $I_1$.

Operations of Reception Device 300

Figure 14:
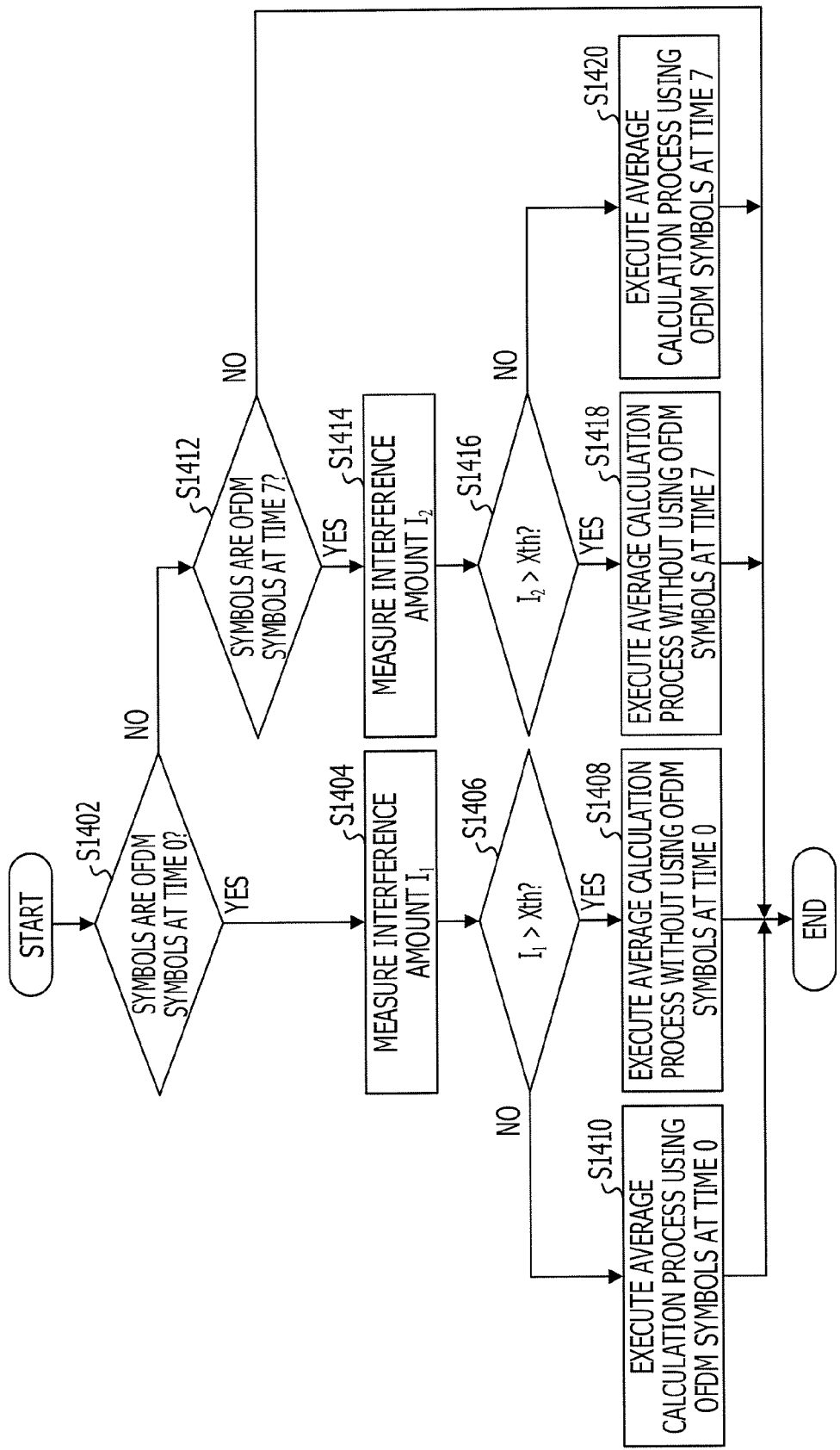
FIG. 14 is a flowchart of operations of the reception device according to the second modified example.

FIG. 14 is a flowchart of operations of the reception device 300 according to the second modified example.

In step S1402, the first interference amount measurer 7082 determines whether or not OFDM symbols are the OFDM symbols at the time 0.

If the first interference amount measurer 7082 determines that the OFDM symbols are the OFDM symbol at the time 0 in step S1402, the first interference amount measurer 7082 measures the interference amount $I_1$ in step S1404.

In step S1406, the OFDM symbol group determining unit 7086 determines whether or not the interference amount $I_1$ is larger than the threshold $X_{th}$.

If the OFDM symbol group determining unit 7086 determines that the interference amount $I_1$ is larger than the threshold $X_{th}$, the OFDM symbol group determining unit 7086 determines that the OFDM symbols at the time 0 are not used in step S1408. The OFDM symbol group determining unit 7086 causes the averaging processor 704 to execute the average calculation process without using the OFDM symbols at the time 0. Then, the OFDM symbol group determining unit 7086 terminates a process illustrated in FIG. 14.

If the OFDM symbol group determining unit 7086 determines that the interference amount $I_1$ is not larger than the threshold $X_{th}$, the OFDM symbol group determining unit 7086 that the OFDM symbols at the time 0 are used in step S1410. The OFDM symbol group determining unit 7086 causes the averaging processor 704 to execute the average calculation process using the OFDM symbols at the time 0. Then, the OFDM symbol group determining unit 7086 terminates the process illustrated in FIG. 14.

If the first interference amount measurer 7082 determines that the OFDM symbols are not the OFDM symbols at the time 0 in step S1402, the second interference amount measurer 7084 determines whether or not the OFDM symbols are the OFDM symbols at the time 7 in step S1412.

If the second interference amount measurer 7084 determines that the OFDM symbols are not the OFDM symbols at the time 7 in step S1412, the second interference amount measurer 7084 terminates the process illustrated in FIG. 14.

If the second interference amount measurer 7084 determines that the OFDM symbols are the OFDM symbols at the time 7 in step S1412, the second interference amount measurer 7084 measures the interference amount $I_2$ in step S1414.

In step S1416, the OFDM symbol group determining unit 7086 determines whether or not the interference amount $I_2$ is larger than the threshold $X_{th}$.

If the OFDM symbol group determining unit 7086 determines that the interference amount $I_2$ is larger than the threshold $X_{th}$ in step S1416, the OFDM symbol group determining unit 7086 determines that the OFDM symbols at the time 7 are not used in step S1418. The OFDM symbol group determining unit 7086 causes the averaging processor 704 to execute the average calculation process without using the OFDM symbols at the time 7. Then, the OFDM symbol group determining unit 7086 terminates the process.

If the OFDM symbol group determining unit 7086 determines that the interference amount $I_2$ is not larger than the threshold $X_{th}$ in step S1416, the OFDM symbol group determining unit 7086 determines that the OFDM symbols at the time 7 are used in step S1420. The OFDM symbol group determining unit 7086 causes the averaging processor 704 to execute the average calculation process using the OFDM symbols at the time 7. Then, the OFDM symbol group determining unit 7086 terminates the process.

The reception device 300 according to the second modified example may determine, based on the interference amounts $I_1$ and $I_2$, whether or not the OFDM symbol groups A and B are used for the process of calculating the average of results of the correlation operation. Since the RSRP may be calculated using OFDM symbols other than OFDM symbols that cause a large amount of interference, the accuracy of the RSRP may be improved. The accuracy of measuring the reception quality may be improved by improving the accuracy of the RSRP.

Third Modified Example

The reception device 300 according to the third modified example is described with reference to FIGS. 5 and 12.

The reception device 300 measures an interference amount for each of OFDM symbol groups. The reception device 300 sets, based on the measured interference amounts, an OFDM symbol group to be averaged for the calculation of the RSRP. For the measurement of the interference amounts, various methods may be used (refer to, for example, "Kawai, Higuchi, Sawahashi, "Independent Adaptive Control of Surviving Symbol Replica Candidates at Each Stage Based on Minimum Branch Metric in QRM-MLD for VSF-Spread OFDM MIMO Multiplexing" "The Institute of Electronics, Information and Communication Engineers, RCS2004-207, October, 2004"").

Functions of Reception Device 300

Figure 15:
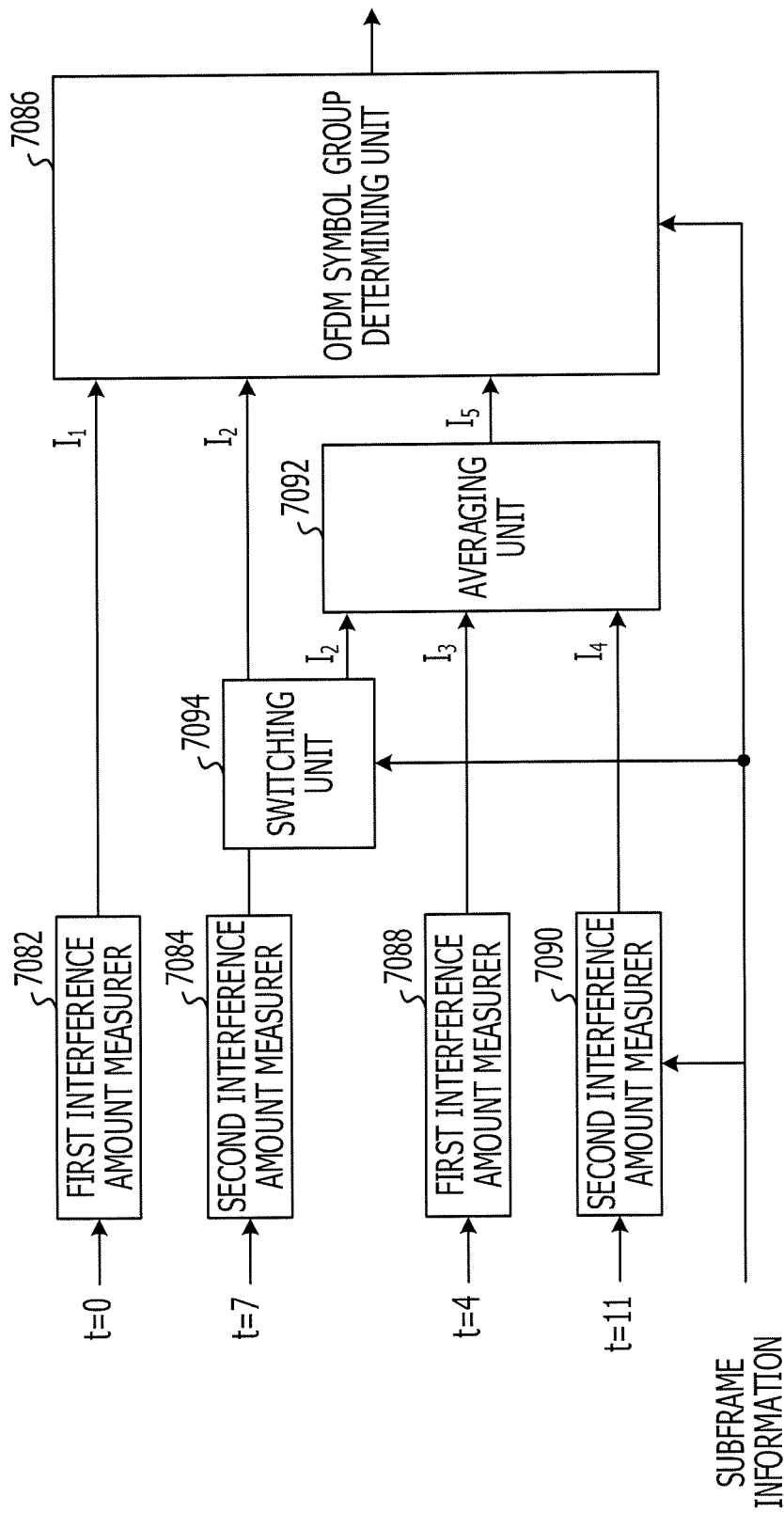
FIG. 15 is a functional block diagram of the reception device according to a third modified example.

FIG. 15 illustrates the controller 708. The controller 708 includes the first interference amount measurer 7082, the second interference amount measurer 7084, a third interference amount measurer 7088, a fourth interference amount measurer 7090, the OFDM symbol group determining unit 7086, an averaging unit 7092, and a switching unit 7094.

The OFDM symbols at the time 0 are input to the first interference amount measurer 7082. The first interference amount measurer 7082 measures the interference amount $I_1$ of the RSs based on the OFDM symbols at the time 0. The first interference amount measurer 7082 causes the interference amount to be input to the OFDM symbol group determining unit 7086.

The OFDM symbols at the time 7 are input to the second interference amount measurer 7084. The second interference amount measurer 7084 measures the interference amount $I_2$ of the RSs based on the OFDM symbols at the time 7. The second interference amount measurer 7084 causes the interference amount $I_2$ to be input to the switching unit 7094.

The OFDM symbols at the time 4 are input to the third interference amount measurer 7088. The third interference amount measurer 7088 measures an interference amount $I_3$ of the RSs based on the OFDM symbols at the time 4. The third interference amount measurer 7088 causes the interference amount $I_3$ to be input to the averaging unit 7092.

The OFDM symbols at the time 11 are input to the fourth interference amount measurer 7090. The fourth interference amount measurer 7090 measures an interference amount $I_4$ of the RSs based on the OFDM symbols at the time 11. The fourth interference amount measurer 7090 causes the interference amount $I_4$ to be input to the averaging unit 7092.

The switching unit 7094 is connected to the second interference amount measurer 7084. A subframe number (subframe information) is input to the switching unit 7094. The subframe number is a subframe number corresponding to the results, input to the averaging processor 704, of the correlation operation. If the input subframe number is #0, the switching unit 7094 causes the interference amount $I_2$ received from the second interference amount measurer 7084 to be input to the OFDM symbol group determining unit 7086. If the input subframe number is not #0, the switching unit 7094 causes the interference amount $I_2$ received from the second interference amount measurer 7084 to be input to the averaging unit 7092.

The averaging unit 7092 is connected to the third interference amount measurer 7088, the fourth interference amount measurer 7090, and the switching unit 7094. The averaging unit 7092 calculates the average of the interference amounts $I_2$, $I_3$, and $I_4$ input when the subframe number is #0. In addition, the averaging unit 7092 calculates the average of the interference amounts $I_3$ and $I_4$ input when the subframe number is not #0. The averaging unit 7092 causes the average interference amount $I_5$ to be input to the OFDM symbol group determining unit 7086.

The OFDM symbol group determining unit 7086 is connected to the first interference amount measurer 7082, the switching unit 7094, and the averaging unit 7092. The subframe information is input to the OFDM symbol group determining unit 7086. The OFDM symbol group determining unit 7086 determines, based on the interference amounts $I_1$, $I_2$, and $I_5$, an OFDM symbol group to be used for the average calculation process.

Case where Subframe Number is #0

The OFDM symbol group determining unit 7086 calculates the difference between the interference amount $I_1$ and the interference amount $I_5$. If the difference between the interference amount $I_1$ and the interference amount $I_5$ exceeds a preset threshold $Y_{th}$, the OFDM symbol group determining unit 7086 determines that the OFDM symbol group at the time 0 is not used for the average calculation process. This is due to the fact that if the difference between the interference amount $I_1$ and the interference amount $I_5$ exceeds the preset threshold $Y_{th}$, it is determined that the amount of interference of the OFDM symbol group at the time 0 is larger than the average of the amounts (that are small) of interference of the OFDM symbol groups at the times 4 and 11. If the difference between the interference amount $I_2$ and the interference amount $I_5$ exceeds a preset threshold $Y_{th}$, the OFDM symbol group determining unit 7086 determines that the OFDM symbol group B is not used for the average calculation process. This is due to the fact that if the difference between the interference amount $I_2$ and the interference amount $I_5$ exceeds the preset threshold $Y_{th}$, the amount of interference of the OFDM symbol group at the time 7 is larger than the average of the amounts (that are small) of interference of the OFDM symbol groups at the times 4 and 11. The threshold that is compared with the difference between the interference amount $I_1$ and the interference amount $I_5$ may be equal to or different from the threshold that is compared with the difference between the interference amount $I_2$ and the interference amount $I_5$.

Case where Subframe Number is not #0

The OFDM symbol group determining unit 7086 calculates the difference between the interference amount $I_1$ and the interference amount $I_5$. If the difference between the interference amount $I_1$ and the interference amount $I_5$ exceeds the preset threshold $Y_{th}$, the OFDM symbol group determining unit 7086 determines that the OFDM symbol group at the time 0 is not used for the average calculation process. This is due to the fact that if the difference between the interference amount $I_1$ and the interference amount $I_5$ exceeds the preset threshold $Y_{th}$, it is determined that the amount of the interference of the OFDM symbol group at the time 0 is larger than the average of the amounts (that are small) of the interference of the OFDM symbol groups at the times 4, 7, and 11.

The OFDM symbol group determining unit 7086 causes information indicating OFDM symbols determined to be used for the average calculation process to be input to the averaging processor 704.

The averaging processor 704 executes the average calculation process based on the information indicating the OFDM symbols and received from the OFDM symbol group determining unit 7086. The averaging processor 704 uses the OFDM symbols at the times 4 and 11 for the average calculation process regardless of the interference amounts.

Operations of Reception Device 300

Figure 16:
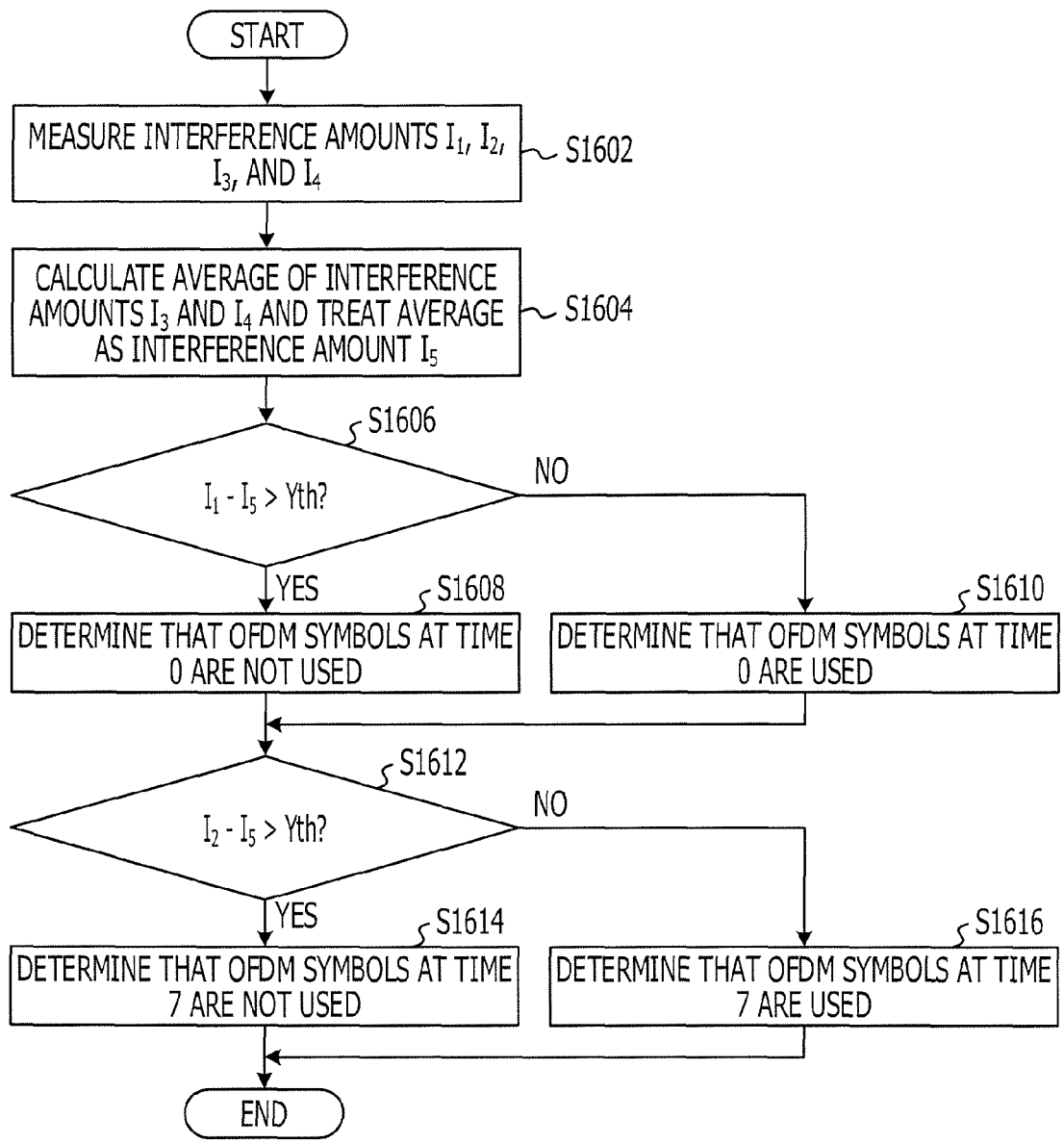
FIG. 16 is a flowchart of operations of the reception device according to the third modified example.

FIG. 16 is a flowchart of operations of the reception device 300 according to the third modified example.

FIG. 16 illustrates the case where the subframe number is #0 as an example.

In step S1602, the first interference amount measurer 7082 measures the interference amount $I_1$ of the OFDM symbols at the time 0, the second interference amount measurer 7084 measures the interference amount $I_2$ of the OFDM symbols at the time 7, the third interference amount measurer 7088 measures the interference amount $I_3$ of the OFDM symbols at the time 4, and the fourth interference amount measurer 7090 measures the interference amount $I_4$ of the OFDM symbols at the time 11.

In step S1604, the averaging unit 7092 calculates the average of the interference amounts $I_3$ and $I_4$ and treats the calculated average as the interference amount $I_5$.

In step S1606, the OFDM symbol group determining unit 7086 determines whether or not the difference between the interference amount $I_1$ and the interference amount $I_5$ exceeds the threshold $Y_{th}$.

If the difference between the interference amount $I_1$ and the interference amount $I_5$ exceeds the threshold $Y_{th}$, the OFDM symbol group determining unit 7086 determines that the OFDM symbols at the time 0 are not used in step S1608.

If the difference between the interference amount $I_1$ and the interference amount $I_5$ does not exceed the threshold $Y_{th}$, the OFDM symbol group determining unit 7086 determines that the OFDM symbols at the time 0 are used in step S1610.

In step S1612, the OFDM symbol group determining unit 7086 determines whether or not the difference between the interference amount $I_2$ and the interference amount $I_5$ exceeds the preset threshold $Y_{th}$.

If the difference between the interference amount $I_2$ and the interference amount $I_5$ exceeds the preset threshold $Y_{th}$, the OFDM symbol group determining unit 7086 determines that the OFDM symbols at the time 7 are not used in step S1614.

If the difference between the interference amount $I_2$ and the interference amount $I_5$ does not exceed the preset threshold $Y_{th}$, the OFDM symbol group determining unit 7086 determines that the OFDM symbols at the time 7 are used in step S1616.

In the flowchart illustrated in FIG. 16, the process of steps S1606 to S1610 may be executed after the process of steps S1612 to S1616.

The reception device 300 according to the third modified example adaptively determines OFDM symbols to be used for the calculation of the RSRP. Since OFDM symbols that cause a large amount of interference are excluded and the RSRP is calculated using OFDM symbols that cause a small amount of interference, the accuracy of the RSRP may be improved. It is determined whether or not certain OFDM symbols are used for the calculation of the RSRP, while the OFDM symbols at the times 4 and 11 that are assumed not to receive interference from a downlink signal transmitted from an interfering cell are used as reference symbols. Thus, if the amount of interference of the certain OFDM symbols is equal to or nearly equal to the OFDM symbols used as the reference symbols, the RSRP may be calculated using the OFDM symbols at the times 0, 4, 7, and 11. The accuracy of measuring the reception quality may be improved by improving the accuracy of calculating the RSRP.

In the embodiment and the modified examples, signal-to-interference ratios (SIRs) may be used instead of the interference amounts.

According to the embodiment and the modified examples, the accuracy of the RSRP may be improved. The accuracy of measuring the reception quality may be improved by improving the accuracy of the RSRP. If the amounts of interference of all OFDM symbols are large, the accuracy of the RSRP is similar to a conventional technique. If the amounts of the interference of the OFDM symbols are different from each other, the RSRP is calculated using OFDM symbols that cause a small amount of interference, and the accuracy of the RSRP may be improved. In other words, the optimal OFDM symbols may be selected for the calculation of the RSRP based on a reception environment.

Figure 17:
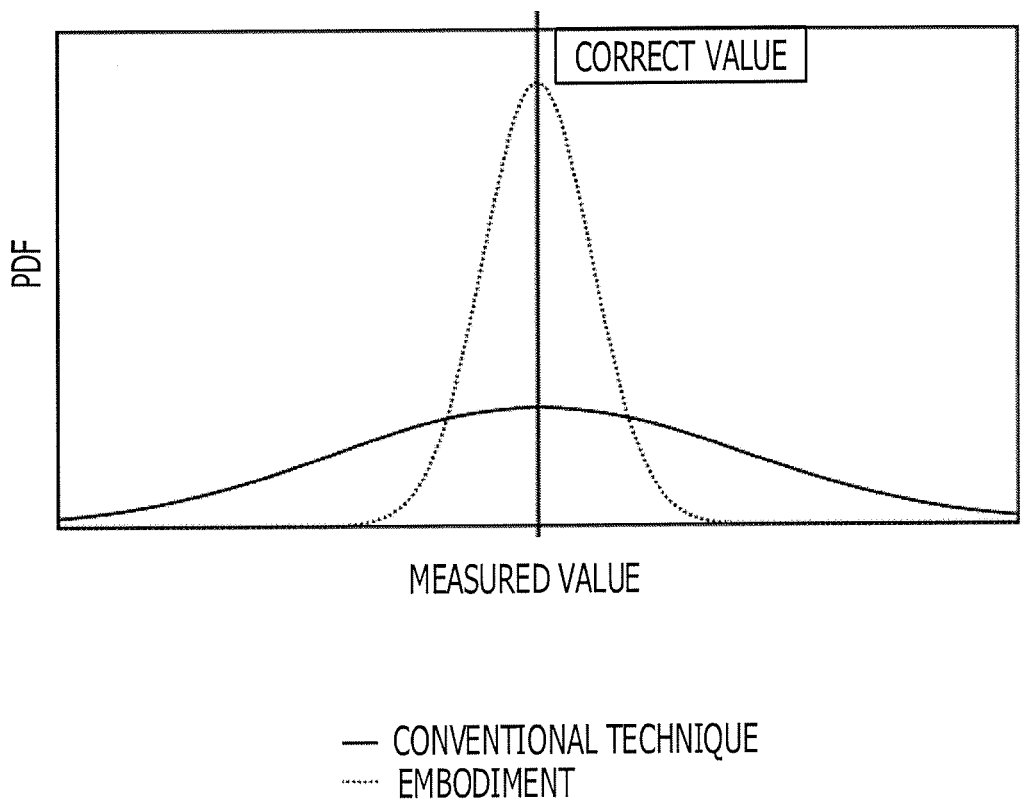
FIG. 17 is a diagram illustrating an example of results of a measurement of a reception quality.

FIG. 17 illustrates measured values of the RSRP when the SIRs of the OFDM symbols at the times 0 and 7 are −7.5 dB and the SIRs of the OFDM symbols at the times 4 and 11 are 10 dB. Specifically, FIG. 17 illustrates deviations of the measured values from a correct value when the amounts of the interference of the OFDM symbols are different from each other. For a conventional technique, it is apparent that the deviation of the measured value from the correct value is large. Thus, a measured value that is different from the correct value is frequently obtained in the conventional technique. It is apparent that a deviation of the measured value from the correct value is small in the embodiment, compared with the conventional technique. Thus, the measured value that is equal to or close to the correct value is obtained in the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A reception device, comprising:
a radio frequency (RF) circuit configured to receive a first signal transmitted from a first transmission device, the first signal including a plurality of known signals; and
a processor configured to:
determine whether a first symbol of the first signal has a probability of receiving interference from a second signal transmitted from a second transmission device,
when the first symbol is determined to have the probability of receiving interference from the second signal, measure a magnitude of interference of a first known signal included in the plurality of known signals, the first known signal being mapped to the first symbol, and
when the magnitude of the interference of the first known signal is equal to or less than a first value, measure a reception quality of the first signal based on the first known signal, and when the magnitude of the interference of the first known signal is greater than the first value, measure the reception quality based on a second known signal included in the plurality of known signals other than the first known signal.

2. The reception device according to claim 1, wherein the first signal includes a second symbol, and the second signal collides with a third known signal mapped to the second symbol.

3. The reception device according to claim 2, wherein the processor is further configured to select, when the first signal per units received by the RF circuit includes the second symbol, the second known signal mapped to a symbol other than the first and second symbols, and
the processor is configured to measure the reception quality based on the second known signal.

4. The reception device according to claim 2, wherein the processor is further configured to select, when the first signal per units received by the RF circuit does not include the second symbol, the second known signal mapped to a symbol other than the first symbol, and
the processor is configured to measure the reception quality based on the second known signal.

5. The reception device according to claim 2,
wherein the processor is further configured to select the second known signal based on whether at least one of the difference between the magnitude of the interference of the third known signal mapped to the second symbol and the magnitude of the interference of a fourth known signal mapped to a third symbol, and the difference between the magnitude of the interference of the first known signal mapped to the first symbol and the magnitude of the interference of the fourth known signal mapped to the third symbol, is equal to or greater than a second value, and
the processor is configured to measure the reception quality based on the selected known signal.

6. The reception device according to claim 2, wherein the second symbol includes a symbol for which a physical broadcast channel is transmitted from the second transmission device.

7. The reception device according to claim 2, wherein the first symbol includes a symbol for which a physical control channel is transmitted from the second transmission device.

8. The reception device according to claim 1, wherein the processor is further configured to:
execute a correlation operation between the first signal and a series of known signals corresponding to the first transmission device, calculate an average of results of the correlation operation of the known signal mapped to a symbol other than the first symbol determined to have the probability, and calculate a reference signal received power (RSRP) based on the calculated average.

9. The reception device according to claim 1, wherein the processor is further configured to select the second known signal based on whether a signal-to-interference ratio (SIR) of another known signal mapped to the first symbol determined to have the probability is equal to or greater than a third value, and the processor is configured to measure the reception quality based on the second known signal.

10. The reception device according to claim 1, wherein the processor is further configured to:

when the magnitude of the interference of the first known signal is equal to or less than the first value, determine an average value of the reception quality for each of the plurality of known signals including the first known signal, and when the magnitude of the interference of the first known signal is greater than the first value, determine the average value of the reception quality for each of the plurality of known signals except for the first known signal.

11. A communication circuit receiving a first signal transmitted from a first transmission device, the first signal including a plurality of known signals, the communication circuit comprising:

a memory; and a processor coupled to the memory and configured to:

determine whether a first symbol of a first signal transmitted from a first transmission device has a probability of receiving interference from a second signal transmitted from second transmission device, when the first symbol is determined to have the probability of receiving interference from the second signal, measure a magnitude of interference of a first known signal included in the plurality of known signals, the first known signal being mapped to the first symbol, and when the magnitude of the interference of the first known signal is equal to or less than a first value, measure a reception quality of the first signal based on the first known signal, and when the magnitude of the interference of the first known signal is greater than the first value, measure the reception quality based on a second known signal included in the plurality of known signals other than the first known signal.

12. A reception method for digital communication to be implemented by a processor, comprising:

receiving a first signal transmitted from a first transmission device, the first signal including a plurality of known signals;

determining whether a first symbol of the first signal has a probability of receiving interference from a second signal transmitted from a second transmission device;

when the first symbol is determined to have the probability of receiving interference from the second signal, measuring a magnitude of interference of a first known signal included in the plurality of known signals, the first known signal being mapped to the first symbol; and when the magnitude of the interference of the first known signal is equal to or less than a first value, measuring a reception quality of the first signal based on the first known signal, and when the magnitude of the interference of the first known signal is greater than the first value, measuring the reception quality based on a second known signal included in the plurality of known signals other than the first known signal.

13. The reception method according to claim 12, wherein the first signal includes a second symbol, and the second signal collides with a third known signal mapped to the second symbol, and a second symbol for which the second signal has a probability of colliding with a known signal.

14. The reception method according to claim 12, further comprising selecting, when the first signal per units by the receiving includes the second symbol, the second known signal mapped to a symbol other than the first and second symbols, and wherein the measuring measures the reception quality based on the second known signal.

15. The reception method according to claim 12, further comprising selecting, when the first signal per units by the receiving does not include the second symbol, the second signal mapped to a symbol other than the first symbol, and wherein the measuring measures the reception quality based on the second known signal.

16. The reception method according to claim 12, further comprising selecting the second known signal based on whether at least one of the difference between the magnitude of the interference of the third known signal mapped to the second symbol and the magnitude of the interference of a fourth known signal mapped to a third symbol, and the difference between the magnitude of the interference of the known signal mapped to the first symbol and the magnitude of the interference of the fourth known signal mapped to the third symbol is equal to or greater than a second value, and wherein the measuring measures the reception quality based on the second known signal.

17. The reception method according to claim 11, further comprising:

selecting the second known signal based on whether a signal-to-interference ratio (SIR) of another known signal mapped to the first symbol determined to have the probability is equal to or greater than a third value, and wherein the measuring measures the reception quality based on the second known signal.

18. The reception method according to claim 11, further comprising:

executing a correlation operation between the first signal and a series of known signals corresponding to the first transmission device;

calculating an average of results of the correlation operation of the known signal mapped to a symbol other than the first symbol determined to have the probability; and calculating a reference signal received power (RSRP) based on the calculated average.

* * * * *